United States Patent
Kazmierczak et al.

(10) Patent No.: US 6,185,807 B1
(45) Date of Patent: Feb. 13, 2001

(54) COMPONENT SEALING SYSTEM

(75) Inventors: Frederick Frank Kazmierczak, San Jose; Michael John Raffetto, Scotts Valley; Michael Kenneth Andrews, Santa Cruz; Michael Alan Maiers, San Jose, all of CA (US)

(73) Assignee: Seagate Technology LLC, Scotts Valley, CA (US)

(*) Notice: Under 35 U.S.C. 154(b), the term of this patent shall be extended for 0 days.

(21) Appl. No.: 08/787,022

(22) Filed: Jan. 28, 1997

(51) Int. Cl.[7] .................................................. B23P 11/02
(52) U.S. Cl. ..................... 29/450; 361/809; 360/97.02; 220/320; 220/681
(58) Field of Search ............................ 29/450, 451, 525, 29/888.3; 220/683, 685, 681, 378, 319, 320; 206/305, 805; 360/97.03, 97.02, 137, 97.01; 277/637, 643, 630

(56) References Cited

U.S. PATENT DOCUMENTS

| | | | |
|---|---|---|---|
| 1,998,791 | * 4/1935 | Schanz | 29/451 |
| 3,074,520 | * 1/1963 | Grubelich . | |
| 3,139,131 | * 6/1964 | Hutchinson | 29/450 |
| 3,291,495 | * 12/1966 | Liebig | 29/451 |
| 3,483,285 | * 12/1969 | Foley | 29/450 |
| 3,743,544 | * 7/1973 | Stewart | 277/637 |
| 4,150,406 | * 4/1979 | Stollorz . | |
| 4,293,135 | * 10/1981 | Wallace | 277/630 |
| 4,854,476 | * 8/1989 | Serio | 277/643 |
| 4,950,521 | * 8/1990 | Takamura | 428/78 |
| 5,021,905 | * 6/1991 | Sleger | 360/97.02 |
| 5,080,252 | * 1/1992 | Haga . | |
| 5,081,552 | * 1/1992 | Glaser et al. . | |
| 5,187,621 | * 2/1993 | Tacklind | 360/97.02 |
| 5,223,996 | * 6/1993 | Read | 360/97.02 |
| 5,270,887 | * 12/1993 | Edwards et al. | 360/97.03 |
| 5,394,306 | * 2/1995 | Koench et al. . | |
| 5,422,766 | * 6/1995 | Hack et al. | 360/97.02 |
| 5,531,455 | * 7/1996 | Calixto | 277/637 |
| 5,703,734 | * 12/1997 | Berberich et al. . | |

* cited by examiner

Primary Examiner—S. Thomas Hughes
Assistant Examiner—Steven Blount
(74) Attorney, Agent, or Firm—Merchant & Gould P.C.

(57) ABSTRACT

Method for the removable sealing of a component housing, and apparatus to practice the method using an elastic or conformable sealing band. The present invention teaches a sealing band, preferably elastic, to apply a horizontal seal to the horizontal seam defined by vertically assembled component case elements. The seal is maintained in position over the seam by an alignment element disposed on at least one of the seal and the case. The sealing band is rendered electrically conductive by admixing therewith a conductive material, or by plating thereon a conductive coating. A retaining element may be further added to at least one of the sealing band and the case to minimize tampering with the sealing band once installed.

4 Claims, 4 Drawing Sheets

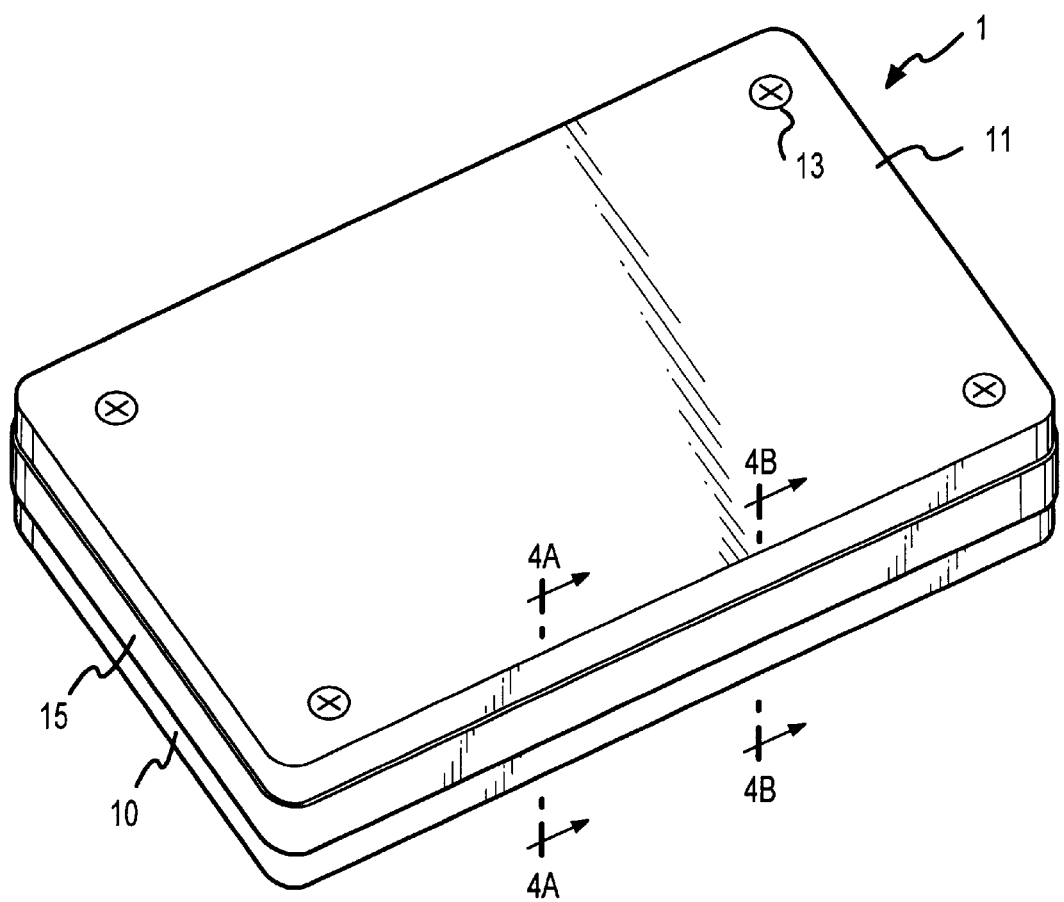
FIG. 4
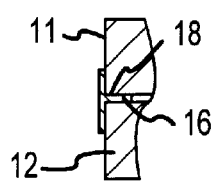 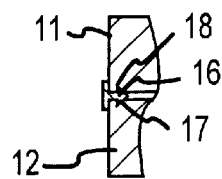
FIG. 4A  FIG. 4B

COMPONENT SEALING SYSTEM

TECHNICAL FIELD

The present invention relates to a methodology for removably sealing housing elements utilizing an elastic seal element. More particularly, the present invention teaches a removable elastic casing methodology applicable to precision electronic component cases and the apparatus to perform the methodology.

BACKGROUND OF THE INVENTION

In many engineering disciplines, one or more housing or case elements are mechanically conjoined to form a chamber wherein the functional components of a device are housed. It is often the case that one or more of the housing elements is itself a functional component of a device. One such example is the housing elements of a computer head disc assembly (HDA). Typically, in most current production HDAs, at least one of the case elements also serves as a mounting frame for mounting at least some of the HDA functional components thereto.

It is often desirable that the housing elements, when mechanically conjoined, provide not only a stable mechanical, electrical, hydraulic, pneumatic or other platform in which the device's functional components operate, but that the housing elements unite to form a sealed environment for maintaining those functional components in some form of controlled environment. This environment may require the retention of a fluid or liquid within the sealed housing, the exclusion of fluids, liquids, or contaminants from without the sealed housing, or a combination of both requirements.

Many HDAs in current production are sealed within two horizontally divided case halves. In a typical instance, a first case element has disposed upon it hard drive functional elements including, but not limited to, at least one magnetically recordable and readable hard disk, a motor to drive the disk, a read/write head mounted on an arm which may be in turn pivotably mounted on the case element, as well as other sundry electro-mechanical and electronic components. A second case element, which may or may not have additional functional elements disposed thereon, is then positioned over the first case element and mechanically secured in place with a plurality of mechanical fasteners, e.g. machine screws.

The plurality of machine screws provide a vertical clamping pressure between the first and second horizontally separated case elements. Captured between the first and second case elements and forming a seal therebetween is often a conformable, or deformable, gasket element. Examples of currently utilized gaskets include but are not limited to die-cut sheet gaskets, cast resilient polymeric gaskets and O-rings. The first and second case elements in operative combination with the screws applying a vertical force to the gasket element seal the cavity formed within the first and second case elements. This has the effect of precluding the unwanted intrusion of contaminants from the ambient atmosphere into the case interior.

Additionally, the case elements/screws/gasket element in operative combination often unite to provide an effective electromagnetic interference (EMI) barrier. EMI can be a significant problem in computer head disc assemblies in that excess levels of EMI can serve to apply an unwanted signal or noise to interior components of the HDA. Such noise can interfere with the proper read/write functionality of the HDA.

The case sealing methodology previously outlined presents several problems during the manufacture of HDAs. First, in order to ensure an effective seal between the first and second case elements, a significant number of screws is often required to obtain the required screw clamping pressure about the periphery of the case elements as well as to obviate case deformation occasioned by that pressure.

A second problem is that during the manufacturing process of HDAs, it is occasionally necessary to rework an HDA being built. This rework is often effected subsequent to a final quality assurance check conducted subsequent to the final assembly of the drive, which check reveals some malfunction. Accordingly, in order to rework a defective drive component after final assembly, it is generally necessary to remove the plurality of screws uniting the first and second case elements in operative combination and to separate those case elements. As the number of screws required to mechanically connect the case elements increases, so increases both the amount of time required to assemble and disassemble the drive, as well as the likelihood that the assembly or disassembly process will damage the screw threads of either the screw itself or of the case elements. Furthermore, it is often the case that a deformable gasket captured and clamped between a first and second case element is permanently deformed thereby or is damaged by the separation of the case elements, necessitating the replacement of the gasket during rework. Each of these factors adds to the time, expense and effort required to rework an HDA.

One alternative to the use of vertically clamped gasket elements in HDA manufacturing technology has been the use of a metalized pressure sensitive adhesive tape applied to the seam between case elements subsequent to their being mechanically conjoined by a plurality of screws. The use of such tape can reduce the number of screws required to mechanically conjoin and seal the several case elements, and the metallic surface provides the requisite EMI barrier. By removing the requirement for an even clamping pressure across a broad horizontal surface, the number of screws required to join the case elements is reduced. Because the pressure sensitive adhesive tape is metalized, it further acts as an effective block to EMI.

While the previously discussed use of pressure sensitive adhesive tape provides an advantage over vertically clamped gaskets, this solution presents a new set of problems to HDA designers. A first problem is occasioned by the fact that the removal of the tape and/or the adhesive residue therefrom during rework constitutes a further increase in labor costs during rework. Further, pieces of tape removed during rework may inadvertently be introduced into the case interior, requiring further effort. A third new problem is occasioned by the fact that adhesives in general, and pressure sensitive adhesives in particular, exhibit an out-gassing of volatile adhesive components, especially the adhesive's solvent or carrier. These volatile components, when admixed with the ambient atmosphere inside the HDA and dispersed therethrough can adversely effect critical electronic or magnetic components contained inside the HDA.

What is needed is some means to quickly and securely seal and unseal HDA case elements. This sealing methodology should reduce the number of screws or other mechanical fasteners required to conjoin the case elements. The methodology should further minimize damage to the case elements in the event it becomes necessary to separate them during rework or repair. The seal should leave no appreciable residue behind on being removed, and should be easily sealed and unsealed. The seal should not introduce any appreciable levels of volatile solvents into the interior of the HDA. It would be additionally advantageous if the seal were reusable: failing that, its removal should not introduce any additional components into the HDA. Finally, the sealing methodology should reduce electromagnetic interference beneath an acceptable threshold level, or preclude it entirely. It would be further desirable if a sealing methodology could facilitate alignment of the several seal elements during construction, and optimally minimize unwanted opening of, or tampering with, the seal.

DISCLOSURE OF INVENTION

The present invention provides a method to quickly and securely seal and unseal HDA case elements, and an apparatus to practice the method. The present invention teaches a conformable, and preferably elastic, sealing band for applying a horizontally biased sealing pressure to the horizontal seam of vertically assembled case elements. An alignment element, disposed on at least one of the sealing band and the assembled case, aligns the band with case seam during assembly, and maintains the band in place once it is assembled to the case. A retaining element may be added to at least one of the case and the sealing band to further secure the band to the case. This retaining element not only aids in positioning the band, but also serves to resist tampering by unauthorized individuals.

The sealing methodology taught herein has the advantage that it can serve to reduce the number of screws or other mechanical fasteners required to conjoin the case elements, as screw clamping pressure is not required to perfect and maintain the seal between case elements. Also, case distortion can be minimized for the same reasons. Further, as no adhesives are used, damage to the case elements is minimized should rework require their separation. The seal leaves no appreciable residue behind on being removed, presents no out-gassing problems, and is easily sealed and unsealed.

The seal taught herein may be impregnated, plated or otherwise coated with electrically conductive material to reduce electromagnetic interference beneath an acceptable threshold level, or to preclude its intrusion into the case entirely. Finally, the methodology taught herein facilitates alignment of the several seal elements during construction, and can be used to minimize unwanted or accidental opening of the sealed case.

Other features of the present invention are disclosed or apparent in the section entitled "BEST MODE OF CARRYING OUT THE INVENTION".

BRIEF DESCRIPTION OF THE DRAWINGS

For fuller understanding of the present invention, reference is made to the accompanying drawing in the following detailed description of the Best Mode of Carrying Out the Invention. In the drawing:

FIG. 4 is a perspective view of a third preferred embodiment of the present invention subsequent to sealing the case with the sealing band.

FIG. 4A is a section view taken substantially along the line 4A—4A in FIG. 4.

FIG. 4B is a section view taken substantially along the line 4B—4B in FIG. 4.

Figure 1:
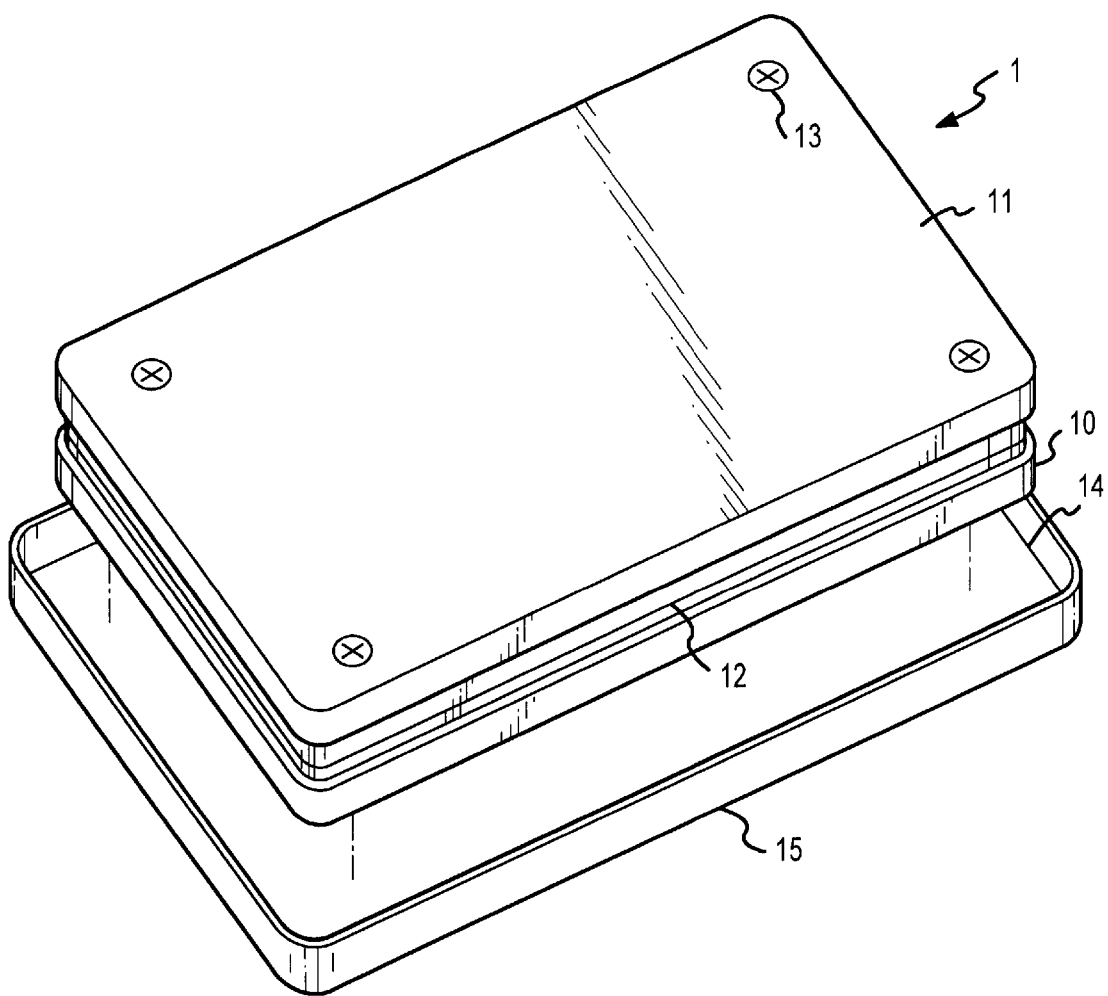
FIG. 1 is a perspective view of a first preferred embodiment of the present invention prior to sealing the case with the sealing band.

Reference numbers refer to the same or equivalent parts of the invention throughout the several figures of the drawing.

BEST MODE OF CARRYING OUT THE INVENTION

Having reference to FIG. 1, a first preferred embodiment for carrying out the principles of the present invention is shown. Having reference to that figure, case 1 is shown to comprise a pair of horizontally separated case elements, 10 and 11. When assembled together, upper case 11 and lower case 10 define horizontal seam 12 therebetween. Case elements 10 and 11 are held and maintained in mechanical alignment by means of fasteners, for instance machine screws 13.

According to this embodiment, upper and lower case elements 11 and 10 respectively, when mechanically fastened and aligned, further define a horizontally annular alignment depression, 14 for receiving therein elastic sealing band 15. Accordingly, it is seen that case 1 comprises a pair of horizontally separated case elements 10 and 11 which are vertically fastened together by machine screws 13.

In order to seal case elements 10 and 11 elastic sealing band 15 is provided. By way of illustration but not limitation, in a first preferred embodiment of the present invention, band 15 is formed of synthetic rubber having admixed therewith a sufficient quantity of electrically conductive powdered metal so as to render it substantially electrically conductive. Alternatively, sealing band 15 may be formed of any of several natural or synthetic elastic monomers or polymers well known to those of ordinary skill in the art. Another alternative consists of depositing a metallic or other conductive coating on sealing band 15 by plating, coating, painting, lamination, or other methodology well known to those of ordinary skill in art. As a further alternative, band 15 may be formed of a conformable material, or materials, which renders it conformable on a single-use basis to the region defined by depression 14. One such conformable material is the plastic "shrink-tubing" well-known in the electronic arts. This shrink-tubing contracts on application of heat.

In a first preferred embodiment of the present invention, elastic sealing band 15 is sized such that its circumference at rest is somewhat smaller than the circumference, within depression 14, of case elements 10 and 11. The sizing of elastic sealing band 15 is further such that when band 15 is fitted to assembled case 1 it not only seals seam 12 but is substantially fully received within depression 14. As shown in FIG. 1, elastic seal band 15 is at the point of being expanded to fit around case 1.

Sealing band 15 is fitted to case 1 in the following manner: sealing band 15 is first elastically expanded such that its circumference is greater than the circumference of case 1. Sealing band 15 is then positioned over depression 14 and allowed to contract. Where required, a pressure may be applied to sealing band 15 on a axis parallel to the seam and hence perpendicular to the assembly axis of case 1. This pressure is sufficient to elastically deform detent 17, thereby enabling the insertion of at least the detent, and preferably the detent and a portion of the alignment surface, into the interior of the case. Thereafter at least a portion of detent 17 is allowed to expand within the interior portion of case 1, whereby detent 17, returned to its substantial initial shape, serves to retain sealing band 15 within depression 14, and hence, case 1.

Figure 3:
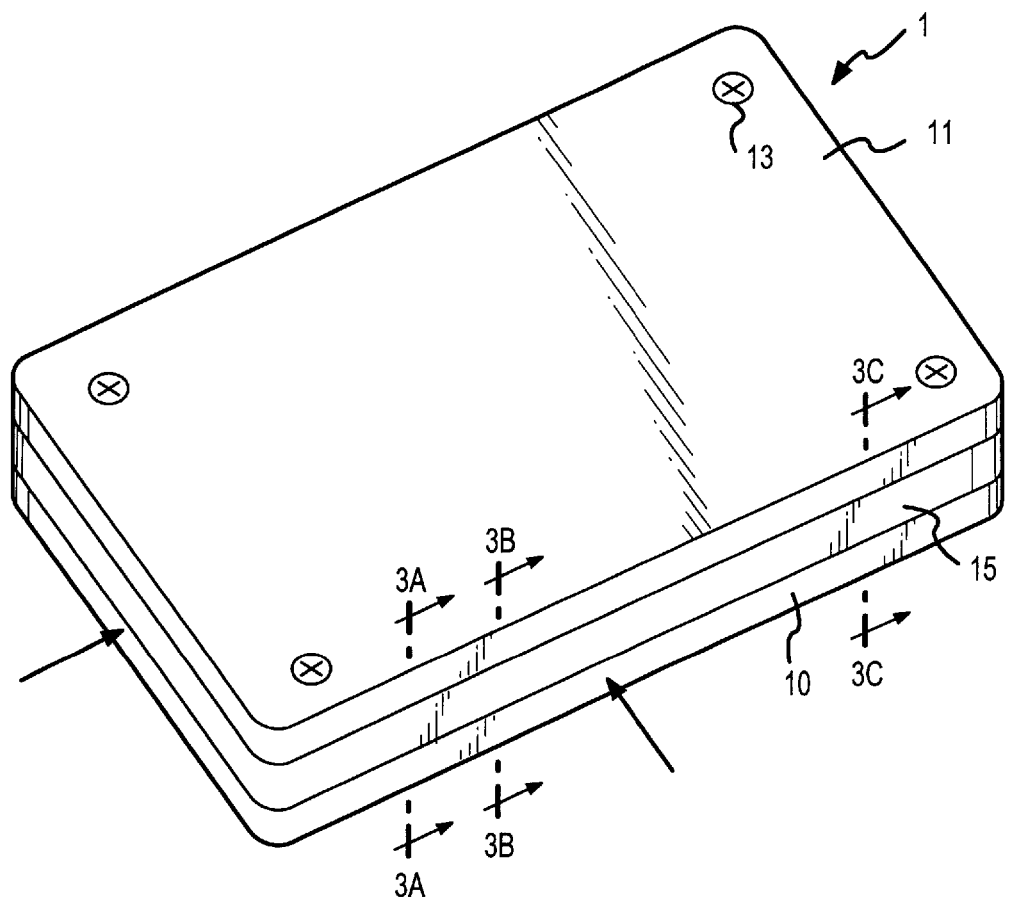
FIG. 3 is a perspective view of a preferred embodiment of the present invention subsequent to sealing the case with the sealing band.
Figure 3A:
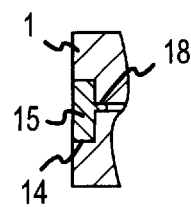
FIG. 3A is a section view taken substantially along the line 3A—3A in FIG. 3.
Figure 3B:
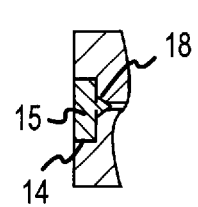
FIG. 3B is a section view taken substantially along the line 3B—3B in FIG. 3.
Figure 3C:
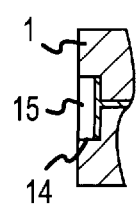
FIG. 3C is a section view taken substantially along the line 3C—3C in FIG. 3.

Referring now to FIG. 3, a view of case 1 having elastic sealing band 15 fitted thereto is shown. As seen in that figure, elastic sealing band 15 not only seals seam 12 (covered by band 15 in this view) but is received into and substantially fills depression 14. Band 15 may take the form of any of several cross-sectional configurations. The simplest of which is an elastic ribbon, attached at either end to form a simple band. A cross-section of this implementation of the present invention is shown in FIG. 3C.

Figure 2:
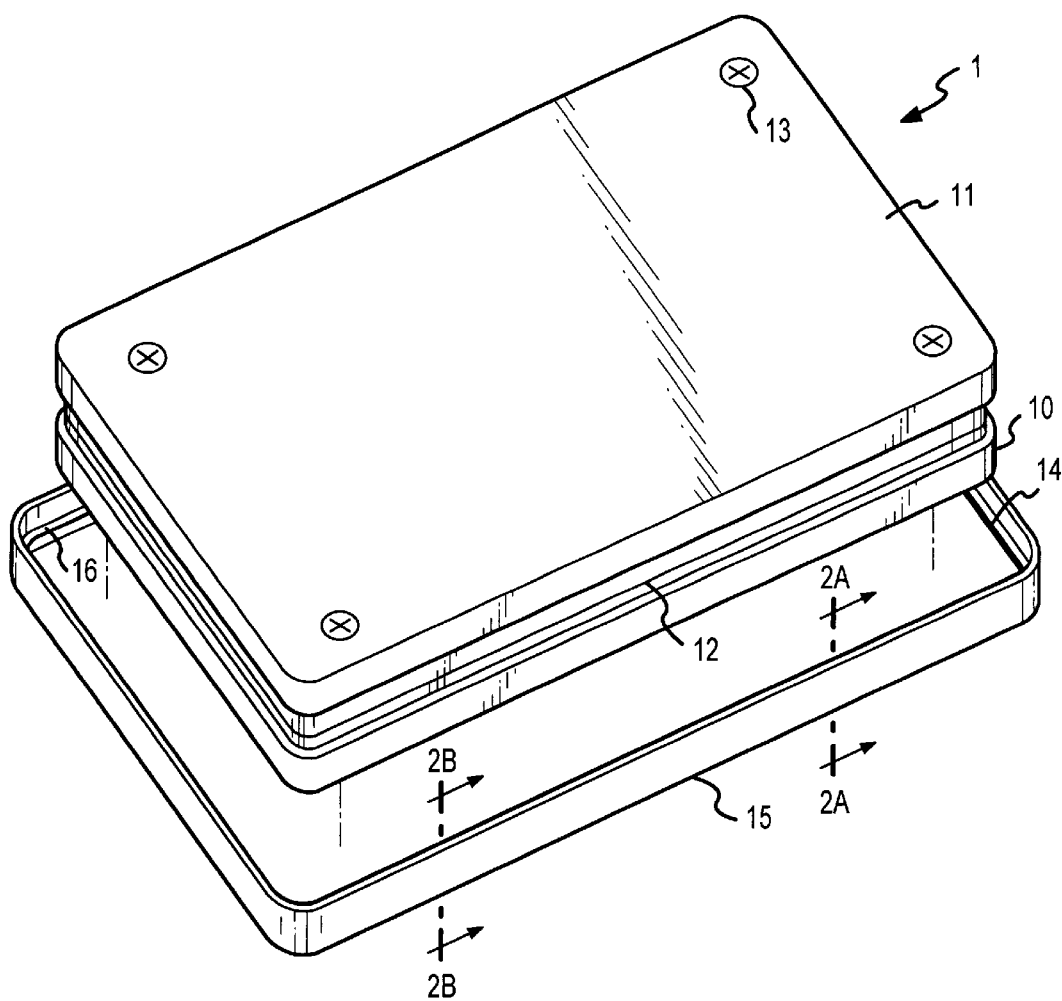
FIG. 2 is a perspective view of a second preferred embodiment of the present invention prior to sealing the case with the sealing band.
Figure 2A:
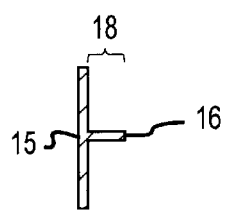
FIG. 2A is a section view taken substantially along the line 2A—2A in FIG. 2
Figure 2B:
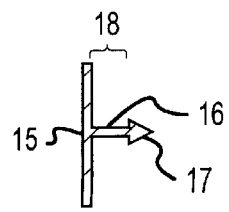
FIG. 2B is a section view taken substantially alone the line 2B—2B in FIG. 2.

A further alternative, embodying an alignment element disposed on sealing band 15 is shown as a second preferred embodiment in FIG. 2. Having reference to that figure, elastic sealing band 15 is further fitted with an alignment surface 16. As shown in FIG. 2A, alignment surface 16 may be implemented as a simple projection, protrusion or ridge 18 formed on an internal surface of band 15, and substantially perpendicular thereto. Another alternative to this implementation consists of the addition to alignment surface 16 of a barb, or detent, 17 to the free end thereof. Such a barbed alignment surface is shown in FIG. 2B.

As a further alternative to the substantially continuous alignment surface 16 or projection 18 shown in FIG. 2, an alternative embodiment may be formed wherein projection 16 is discontinuous. By way of illustration, but not limitation, such an implementation might be utilized where it is desirable for reasons of space or ease of installation to eliminate the projection 16 where it will be engaged at the corners of case 1.

A third preferred embodiment of the present invention is shown at FIG. 4, wherein it is desirable to form the case without depression 14, not shown in this embodiment. In this implementation, elastic sealing band 15 is maintained in substantial alignment with case 1 by means of projection 16 inserted into horizontal seam 12 (covered by band 15 in this view). In this instance, the alignment projection 16 of band 15 serves as the sole alignment methodology, and is shown in FIG. 4A. As before, a barb or other projection 17 may be added to projection 16 as shown in FIG. 4B to minimize tampering with the seal.

The present invention has been particularly shown and described with respect to certain preferred embodiments of features thereof. However, it should be readily apparent to those of ordinary skill in the art that various changes and modifications in form and detail may be made without departing from the spirit and scope of the invention as set forth in the appended claims. In particular, differing materials, seal plans and cross-sections, electrical conducting methodologies, and mechanical fasteners may, with equal facility, be implemented without departing from the teachings set forth herein, and such alternatives are specifically contemplated by the principles of the present invention. Furthermore, while the discussion herein of the principles of the present invention has centered on an implementation on computer head disc assemblies, it will be apparent to those of ordinary skill in the art that the invention taught herein may, with equal facility, be implemented on a broad range of component sealing applications. All such implementations are specifically contemplated by the principles of the present invention. The invention disclosed herein may be practiced without any element which is not specifically disclosed herein.

What is claimed is:

1. A method for reversibly sealing a housing joint, the housing comprising a first housing element and a second housing element assembled in a first axis and defining therebetween a joint, said method comprising the steps of:
   (a) forming an alignment element on an inner surface of an elastic sealing band, the alignment element disposed substantially perpendicular to the inner surface of the sealing band and having a first end disposed on the inner surface and a second end opposite the first end, the second end defining an elastically deformable retaining element;
   (b) stretching the elastic sealing band to surround the housing;
   (c) aligning the alignment element with the joint and allowing the sealing band to contract to apply a sealing pressure along a second axis substantially normal to the first axis to reversibly seal the joint;
   (d) applying a mating pressure to the sealing band along the second axis, the mating pressure being sufficient to insert the second end of the alignment element into the joint and elastically deform the retaining element; and
   (e) allowing at least a portion of the retaining element to elastically expand within the housing to elastically retain the sealing band within the joint.

2. The method of claim 1, wherein the first and second housing elements are rendered electrically conductive, the method further comprising the step of:
   (f) rendering a portion of the sealing band electrically conductive to form, in operative combination with the electrically conductive first and second housing elements, a substantial barrier to transfers of electromagnetic energy through the housing.

3. The method of claim 1, further comprising the step of:
   (f) forming a depression at a juncture of the first and second housing elements congruent with the joint, the depression operative to receive the elastic sealing band.

4. The method of claim 1, wherein the forming step (a) comprises forming the alignment element discontinuously about the inner surface of the elastic sealing band.

* * * * *